Jan. 15, 1929.
B. POLÁK
1,699,445
OPENER FOR TINS OR THE LIKE CONTAINERS
Filed March 4, 1927
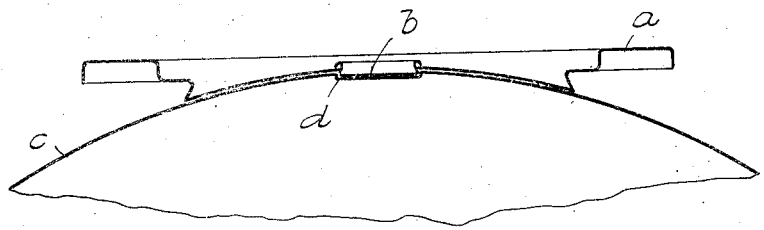
INVENTOR
Bohumil Polák
by
Langner, Parry, Card & Langner
ATTORNEYS Patented Jan. 15, 1929.

1,699,445

UNITED STATES PATENT OFFICE.

BOHUMIL POLÁK, OF PRAGUE, CZECHOSLOVAKIA.

OPENER FOR TINS OR THE LIKE CONTAINERS.

Application filed March 4, 1927, Serial No. 172,798, and in Czechoslovakia December 22, 1926.

This invention concerns an improved opener, for tins or the like containers, of the type rotatably mounted on one part of the container and adapted on rotation to lift the lid or cover thereof.

In a known arrangement the opener is journalled in a U shaped strip of metal welded or soldered at both its ends to the tin. Such an opener consists, therefore, of three parts, namely the opener proper, a rivet and the U shaped mounting. Prior to the welding or soldering these three parts have to be riveted together, it being necessary to dispose the opener at right angles to the mounting, so as to render the parts to be soldered accessible.

In the opener according to the present invention the hollow rivet or the like on which the opener is pivoted is welded, preferably at one point, directly to the container.

An opener according to this invention is illustrated by way of example in the drawing in a sectional view perpendicular to the axis of the tin.

Referring to the drawing a tin opener $a$, which in plan view is preferably lever-shaped and in section may be of any desired shape, is mounted on a hollow rivet $b$ in such a manner as to be capable of rotating freely on the latter. The said rivet is welded at one point at the centre to the wall of the tin $c$, preferably by electrical welding. To ensure the welding of the opener at exactly the desired spot, a recess $d$ is preferably pressed beforehand in the wall of the tin. The head of the rivet $b$ is inserted in this recess prior to the welding, its exact positioning being thus greatly facilitated and possible displacement before or during welding avoided. It will be seen that the opener according to the invention consists, therefore, of two parts only, namely the opener proper $a$ and the rivet $b$.

Having now particularly described and ascertained the nature of my said invention and in what manner the same is to be performed, I declare that what I claim is:

1. In combination, a metal container having a lid, an opener therefor, comprising a cam for engaging an edge of said lid, and a pivot rotatably attached to said cam, said pivot having a flat base and said container having an allocating recess receiving said base, said pivot being welded to the outside of the container within said recess.

2. A lid opener for friction lid containers of the type in which the lid tightly telescopes over the sides of the container, comprising a unitary device including a cam for engaging the edge of the lid and a pivot rotatably attached to said cam, said pivot having a flat base forming a surface adapted to be spot welded to the side of the container below the lid.

Signed at Prague, Czechoslovakia, this 15th day of February, A. D. 1927.

BOHUMIL POLÁK.